No. 707,846.  
E. M. HEYLMAN.  
SEEDING MACHINE.  
(Application filed Feb. 18, 1902.)  
Patented Aug. 26, 1902.

(No Model.)  
2 Sheets—Sheet 1.

Witnesses.

Edward M. Heylman  
Inventor.

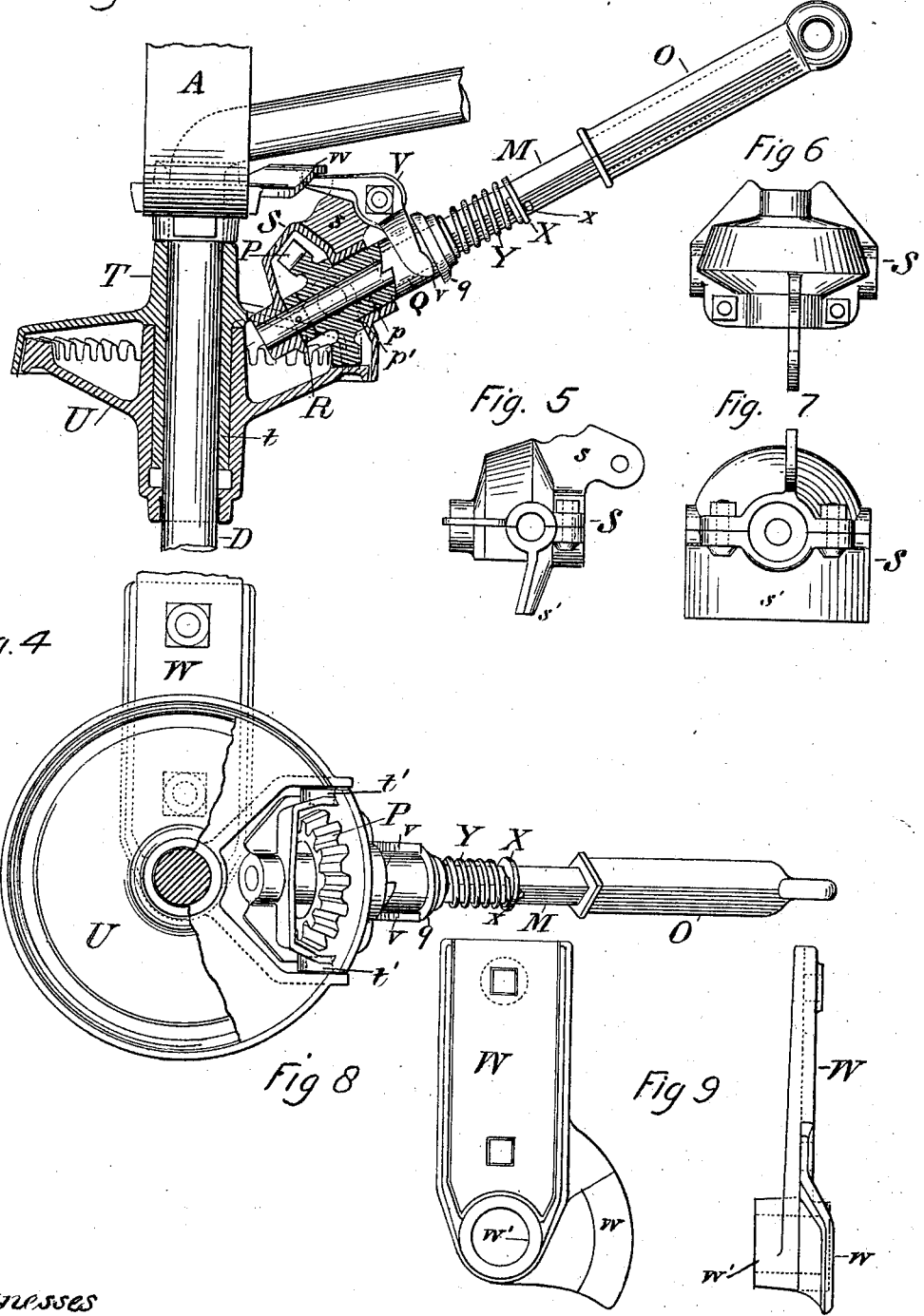

UNITED STATES PATENT OFFICE.

EDWARD M. HEYLMAN, OF JANESVILLE, WISCONSIN, ASSIGNOR TO JANESVILLE MACHINE COMPANY, OF JANESVILLE, WISCONSIN.

SEEDING-MACHINE.

SPECIFICATION forming part of Letters Patent No. 707,846, dated August 26, 1902.

Application filed February 18, 1902. Serial No. 94,604. (No model.)

*To all whom it may concern:*

Be it known that I, EDWARD M. HEYLMAN, a citizen of the United States, residing at Janesville, in the county of Rock and State of Wisconsin, have invented certain new and useful Improvements in Seeding-Machines; and I do hereby declare the following to be a full, clear, and exact description of the invention, such as will enable others skilled in the art to which it appertains to make and use the same.

My invention relates to seeding-machines of the class known as "sulky-listers," having seed-dropping mechanism mounted upon the plow-beam of a sulky-plow and operated by the carrying-wheels of such machine.

The object of my invention is to provide such machines with means whereby the seed-dropping mechanism may operate while the plow is in the ground and automatically cease to operate when the plow is removed from the ground.

To this end my invention consists in combining with such seed-dropping mechanism a rotary shaft provided with a pinion operated by a connection with one of the carrying-wheels and adapted to rotate said shaft when the plow is in the ground and to rotate freely on said shaft when the plow is raised from the ground, so that said shaft and seed-dropping mechanism will remain idle at such time.

Figure 1:
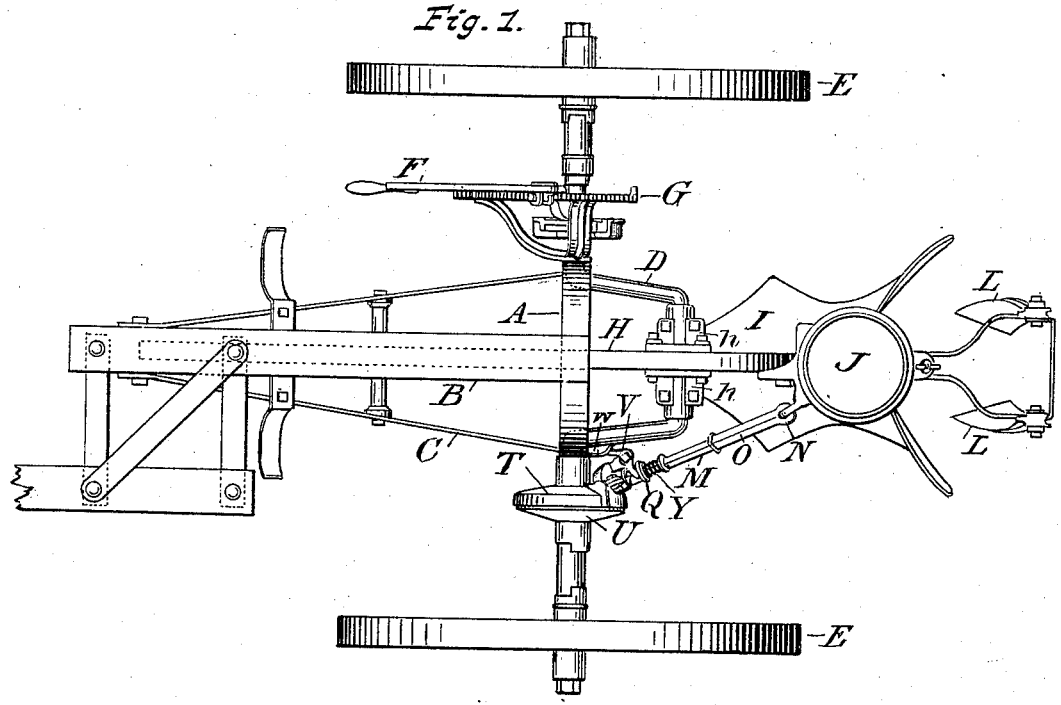
Figure 2:
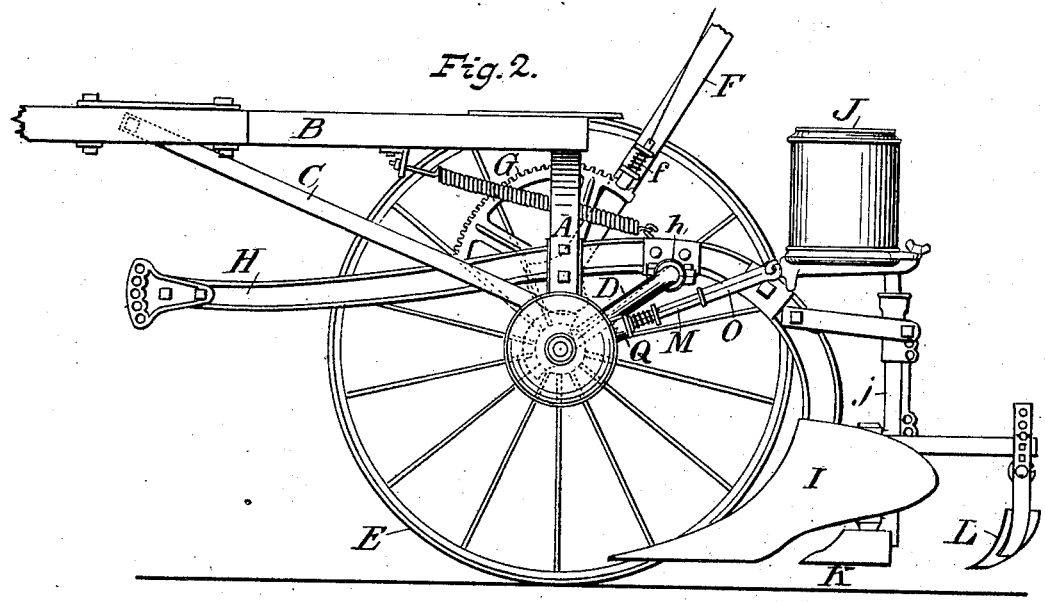

In the drawings, Figure 1 is a plan view of a sulky-lister embodying my invention. Fig. 2 is a side elevation of the same. Fig. 3 is a plan view, partly in section, of means for operating a rotary shaft connected with seed-dropping mechanism. Fig. 4 is a sectional side elevation of the parts shown in Fig 3. Fig. 5 is a plan view of a pivoted pinion-casing. Fig. 6 is an inner side elevation of such casing. Fig. 7 is a rear view of the same. Fig. 8 is a front elevation of a bearing-bracket having a flange-cam. Fig. 9 is a side elevation of said bracket.

As illustrated in the drawings, the main frame of the machine consists of a transverse arch A, mounted upon a crank-axle D and provided with a stub-tongue B, secured thereto, having braces C secured at their forward ends to said tongue and at their rear ends to the arch A of the main frame in any suitable manner. A lever F is connected with said crank-axle and provided with a latch $f$, adapted to engage a segmental rack G, secured to the main frame, by means of which the crank of said axle may be raised and lowered or moved forward and backward and locked securely in the desired position. A plow-beam H, supporting a plow I, is mounted upon the crank of said axle by means of a bearing $h$ and is raised and lowered or moved forward and backward by a corresponding movement of the crank of said axle. A seed-receptacle J is also secured to the said plow-beam and provided with a tube $j$, having its lower end arranged behind a subsoiler K and in front of coverers L, which are also attached to or connected with said plow-beam. The seed-dropping mechanism connected with the seed-receptacle may be of any well-known construction and is operated by means of a rotary shaft M, which engages a sleeve O, having a gimbal-joint N or other loose-jointed connection with the seed-dropping mechanism. The main portion of the shaft M is rectangular and has a sliding connection with the rectangular sleeve O. A pinion P is loosely mounted on the round end of the rotary shaft M and is provided with an extended hub $p$, having its end indented to engage the corresponding indented end of a clutch Q, which has a sliding connection with the rectangular portion of the shaft M. A collar R is rigidly secured to the shaft M, by means of which this end of said shaft is prevented from sliding in the housing S, in which the round end of the shaft M is journaled. The hub $p$ of the pinion P is journaled in the housing S and provided with a shoulder $p'$, which bears against such housing, which, together with the collar R, prevents an outward sliding movement of the rotary shaft M. The pinion-housing S is constructed in two parts, secured together by means of bolts, and such parts are provided with semisockets forming bearings for the pins $t'$, extending from the gear-casing T, thereby permitting a limited lateral swiveling movement of the pinion-housing on the gear-casing. The gear-casing T is provided with a sleeve $t$, which is mounted upon the crank-axle D, and the outer surface of said sleeve is preferably machinefinished, so as to form a suitable bearing for the hub of the driving-gear U, which is journaled on said sleeve. A long bearing is thereby provided for the gear-casing T on the axle, and a closely-fitting bearing is also provided for the driving-gear U of the sleeve of said casing, which enables said gear to rotate evenly and smoothly on the sleeve of the gear-casing with a minimum amount of friction. By pivoting the pinion-housing S to the gear-casing T the driving-gear U and the pinion P are held continuously in mesh and the rotating shaft M and pinion P, journaled in said housing, are enabled to swivel to the proper alinement as the plow is being raised or lowered.

The pinion-housing S is provided with an extension or shelf s, upon which is mounted a bell-crank lever V and secured thereto by means of a bolt and nut. One end v of said lever is bifurcated, so as to straddle and bear evenly against the clutch Q and move said clutch longitudinally on said shaft against the tension of the spring Y, which is secured in place on said shaft by means of the washer X and pin x. The opposite arm of said lever is arranged in close proximity to an inclined plate or cam-flange w, extending outward from a bracket W, which bracket is secured to the main frame of the machine, preferably to the arch A of the main frame, and provided with a hub w', in which is formed a bearing for one end of the crank-axle D.

When in use, the driving-gear U is operated by means of a clutch on the hub of one of the carrying-wheels interlocking with a clutch on said gear and meshes with and operates the pinion P, which pinion is mounted freely on the round end of the rotary shaft M and engages the clutch Q on said rotary shaft, causing said clutch to rotate and give corresponding rotary motion to said shaft by means of its rectangular engaging connection with said shaft, and thereby operate the seed-dropping mechanism connected with the seed-receptacle J. When the plow-beam is raised by means of the lever F, one end of the bell-crank lever V comes in contact with the inclined face of the cam-flange w, thereby forcing the bifurcated end of said lever V against the annular shoulder q of the clutch Q, so as to force said clutch out of engagement with the end of the pinion P and enable said pinion to rotate freely on the round end of said shaft without imparting motion to said shaft or seed-dropping mechanism. When, however, the plow is lowered, the clutch Q is forced into engagement with the end of the hub p of the pinion P by means of the spring Y, and the motion imparted to the pinion P by means of the driving-gear U is transmitted to the shaft M by means of such clutch and the rectangular connection between the clutch and the rotating bar.

I do not desire to be limited to the specific construction of the several parts shown herein, as such parts may be modified without departing from my invention. Thus in some instances the sleeve t of the gear-casing T may be discarded and the hub of the driving-gear U journaled on the axle D. While the general result would be the same, a considerably greater amount of friction would be produced, as the gear U is a revolving member, and the casing T only swings on the axle while the plow is being raised or lowered.

What I claim, and desire to secure by Letters Patent, is—

1. The combination with carrying-wheels, of an arched axle, a gear-casing journaled on said axle and provided with a sleeve, and a driving-gear journaled on said sleeve and operated by one of said carrying-wheels, substantially as shown and described.

2. The combination with carrying-wheels, of a crank-axle, a driving-gear, a gear-casing mounted on said axle, a pinion-housing pivoted to said casing, and a rotating shaft provided with a pinion and journaled in said housing, substantially as shown and described.

3. The combination with carrying-wheels, of an arched axle, a gear-casing mounted on said axle, a driving-gear, a pinion-housing pivoted to said casing, a rotating shaft provided with a pinion journaled in said housing, a clutch adapted to slide on said shaft and means for sliding said clutch on said shaft, substantially as shown and described.

4. The combination with carrying-wheels, of an arched axle, a gear-casing mounted on said axle, a driving-gear, a pinion-housing pivoted to said casing, a rotating shaft journaled in said housing and provided with a pinion, a sliding clutch mounted on said rotating shaft and adapted to engage said pinion, a pivoted lever adapted to slide said clutch longitudinally of said shaft, and an inclined flange arranged in close proximity to one end of said lever, substantially as shown and described.

5. The combination with carrying-wheels, of a crank-axle, a gear-casing journaled on said axle, a driving-gear journaled in said casing, a pinion-housing pivoted to said casing, a rotating shaft journaled in said casing, a pinion adapted to rotate on said shaft, and a clutch adapted to slide on said shaft and to have a locking engagement with said pinion, substantially as shown and described.

6. The combination with a pivoted housing, of a rotating shaft having one end journaled in said housing, a pinion adapted to rotate on said shaft and provided with a hub having a shoulder adapted to bear against said housing, and a collar rigidly secured to said shaft and arranged between said pinion and housing, substantially as shown and described.

7. The combination with carrying-wheels, of a crank-axle, a plow-beam mounted on said axle, a gear-casing journaled on said axle, a driving-gear journaled on said casing, a pinion-housing pivoted to said gear-casing, a rotating shaft journaled in said housing, a pinion loosely mounted on said shaft and journaled in said housing, a clutch having a sliding engagement with said pinion, an inclined flange, and a lever adapted to engage said clutch and flange and remove said clutch from engagement with said pinion, substantially as shown and described.

In testimony whereof I affix my signature in presence of two witnesses.

EDWARD M. HEYLMAN.

Witnesses:
F. H. FARNSWORTH,
R. C. PURCELL.